US009973797B1

(12) United States Patent
Docherty et al.

(10) Patent No.: US 9,973,797 B1
(45) Date of Patent: May 15, 2018

(54) VIDEO ON DEMAND CONSUMPTION LEARNING SYSTEM

(71) Applicant: ThinkAnalytics, El Segundo, CA (US)

(72) Inventors: Peter Docherty, Glasgow (GB); Ewen Cattanach, Woodbridge (GB); Bruce Zhang, Glasgow (GB); David Scott, Glasgow (GB); Shahad Ahmed, Glasgow (GB); Alan Ryman, Glasgow (GB); Asim Ullah, Glasgow (GB); Darren Callaghan, Glasgow (GB); Gordon McIntyre, Glasgow (GB)

(73) Assignee: ThinkAnalytics, El Segundo, CA (US)

( * ) Notice: Subject to any disclaimer, the term of this patent is extended or adjusted under 35 U.S.C. 154(b) by 0 days. days.

(21) Appl. No.: 14/743,982

(22) Filed: Jun. 18, 2015

Related U.S. Application Data (60) Provisional application No. 62/013,772, filed on Jun. 18, 2014.

(51) Int. Cl.
*H04H 60/32* (2008.01)
*H04N 21/25* (2011.01)
*H04L 29/08* (2006.01)
*H04N 21/24* (2011.01)

(52) U.S. Cl.
CPC .......... *H04N 21/251* (2013.01); *H04L 67/22* (2013.01); *H04L 67/306* (2013.01); *H04N 21/24* (2013.01)

(58) Field of Classification Search
CPC ............... H04N 21/251; H04N 21/252; H04N 21/25892
See application file for complete search history.

(56) References Cited

U.S. PATENT DOCUMENTS

| | | | |
|---|---|---|---|
| 2013/0204825 A1* | 8/2013 | Su | G06N 5/04 706/46 |
| 2013/0268479 A1* | 10/2013 | Andler | G06F 17/30563 707/602 |

* cited by examiner

*Primary Examiner* — Gigi L Dubasky
(74) *Attorney, Agent, or Firm* — FSP LLC (57) ABSTRACT

A user profile including content preferences is evolved by detecting and identifying user actions on network connected digital devices; relating the user actions to digital content; operating a sequencer and a timer to form aggregate user actions from the user actions; operating a second associator in conjunction with the timer and an adjuster to associate weight values with the aggregate user actions and the user actions, forming weighted user actions; and operating a profile server responsive to the second associator to evolve the user profile according to the weighted user actions.

12 Claims, 5 Drawing Sheets

VIDEO ON DEMAND CONSUMPTION LEARNING SYSTEM

CROSS-REFERENCE TO RELATED APPLICATIONS

This application claims priority under 35 U.S.C. 119 to U.S. application Ser. No. 62/013,772, filed on Jun. 18, 2014, which is incorporated herein by reference in its entirety.

BACKGROUND

Video on demand is a popular form of content delivery. There are systems that analyze what a viewer watches on video on demand and suggest related titles. However, these systems don't take into account many factors that can weight or affect the relevance of a particular viewing choice.

BRIEF SUMMARY

In some embodiments, a method for evolving a user profile may include detecting and identifying user actions on network connected digital devices; relating the user actions to digital content; operating a sequencer and a timer to form aggregate user actions from the user actions; operating a second associator in conjunction with the timer and an adjuster to associate weight values with the aggregate user actions and the user actions, forming weighted user actions; and/or operating a profile server responsive to the second associator to evolve the user profile according to the weighted user actions.

In some embodiments, such a method may further include detecting and identifying operations of the digital devices and/or relating the operations of the digital devices to the user actions.

In some embodiments, such a method may further include recommending the digital content to the digital devices responsive to the user profile.

In some embodiments, such a method may further include forming the aggregate user actions based on configured intervals between the user actions as measured by the timer.

In some embodiments, such a method may further include forming at least one of the aggregate user actions as an accumulation of playback of a particular digital content item over a group of separated time intervals.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

"Set Top Box" in this context refers to (STB) an electronic device that adapts a communications medium to a format that is accessible by the end user. Set top boxes are commonly located in a customers home to allow the reception of video signals on a television or computer.

"Video" in this context refers to pixels captured and stored by a device representing a sequence of moving pictures. Video may be captured, stored, and communicated by devices in either analog or digital formats. (1) Refers to recording, manipulating, and displaying moving images, especially in a format that can be presented on a television. (2) Refers to displaying images and text on a computer monitor or mobile device. The video adapter, for example, is responsible for sending signals to the display device. (n.) A recording produced with a video recorder (camcorder) or some other device that captures full motion.

"Video Server" in this context refers to a server that provides video and/or specialized television capabilities. Video servers receive requests for video and/or media delivery, find the matching media, and deliver the video program as requested.

"Web server" in this context refers to a device or device system that delivers web pages in response to requests for the web pages from web browsers. Also, logic to communicate web pages at the request of clients, most typically using the Hypertext Transfer Protocol (HTTP). The server communicates HTML documents and any additional content that may be included by a document, such as images, style sheets and scripts, as well as content referenced by certain types of links (pointers) in the web pages. A user agent, commonly a web browser or web crawler, initiates communication with the web server by making a request for a resource using (typically) HTTP, and the server responds with the content of that resource or an error message if unable to do so. The resource is typically a file on the server's secondary storage, but this is not necessarily the case. Many web servers have a capability of receiving content from clients. This feature is used for submitting web forms, including uploading of files.

Description

Embodiments of a system are disclosed wherein learned actions are formed to control the operation of a digital content recommendations engine (CRE) for identified users of digital devices. User actions may be associated with device operation for downloaded, recorded, purchased, watched or played content items, for example. Learned actions be applied to enhance the user's profile of content preferences and therefore provide more accurate personalized content recommendations to the user in the future.

User actions and device operational data is analyzed for events that define a user's activity and interactions with the various content items that they have watched, downloaded, purchased, etc.

If a sequence of different events is received for a same content item, then each of the event types may be used as a separate learn action with the specific activity type defined. Sequencing learn actions in this manner ensures a user's profile dynamically updates to reflect the evolving interaction with the content item. Updating the profile in dynamic increments provides the CRE an advantage of using the updated profile, allowing for better personalized results. This effect may be amplified if the events are separated by variable amounts of time, for example a user purchases an item today, but watches the item in four days time. Below are some example scenarios:

Upon associating actions/operations with a particular activity actionId (e.g. Download, Purchased, Played), the CRE may apply a relative weighting scheme for the features of the item to be assigned to the users taste profile for that particular action type of content category. Certain of the activity types may be assigned a lower weight and therefore impact on the taste profile. For example, wish-listing, bookmarking or browsing may have, by default, a lesser impact on a users learned taste profile than, say, purchasing, downloading or playing an item.

A learn action issued in response to a purchase of digital content may associate the content event and financial payment and thus be weighted higher by the CRE.

If the association is erroneous, and a payment is only made when, for example, a follow-up played consumption event is initiated, then the purchased learn action weighting could be lowered from the default setting within the CRE, thus reducing its influence on evolving the user profile. A reason for reducing the weight is that a user may initiate a purchased event far more frequently than a played event, especially if they are not charged for the initial purchased event.

If there are content items that are downloadable on either a paid for basis, for example a transactional item, or on a free to download basis, for example a catch-up or subscription content service, then learn actions may be sent with activity types that differentiate between the two sorts of content. For example a purchased activity could be assigned to the paid-for items and a download event assigned to the free items. For free items, the activity weighting for the learn action may be lowered to ensure that the impact is adjusted against the potential more frequent event type.

Custom activity types can also be defined to capture the exact intent of an event if the default activity types defined for the learn action aren't representative.

If certain content items have associated pre-roll, mid-roll, or post-roll adverts, then generating a learn action that indicates that a user has watched the Item with a pre-roll (or mid-roll) advert may help differentiate that watch activity as having a higher impact on the users taste profile, as the user has had to invest some time in watching an additional advert to watch the item. Creating a custom activity type for the learn action could be used to capture this behavior. This new activity type may then be assigned a higher weighting than the default played or watched activity types.

Short content items that fall into a number of different content categories:

Trailers-item that represents a trailer for a current or upcoming content item;

Interviews-items containing cast/crew interviews for a current/upcoming content item;

Extras-items containing 'Behind the Scenes', Recap or other content

These short items could be associated with a 'full' content item, such as a movie, series or a particular episode, and a learn action may be generated for watching such a short item, with an appropriately reduced activity weighting. A default activity type called 'watch' or 'listen to trailer' may be configured, but a custom activity type could be configured to represent more accurately the use-cases around watching short items.

If the consumption event for the content item is of type 'played' and the duration of the event and the full running length of the content item is known, then the total played duration for the item can be calculated. A learn action may then be generated for the item if the duration played was greater than a percentage of the items running length. An example for this percentage is 30%. This means that a learn action is generated only after 30% of an item's running length has been played. An example of this is: The movie 'Avatar' has running time of 171 minutes, and a user starts playing the VOD asset, but watches it in sections over a period of time. When it is recognised that the user has watched over 30% of the VOD item (in the example above it is a combined play duration greater than 52 minutes) a learn action for the played activity is fired to signify that the users taste profile should be updated with the knowledge that they watched Avatar and the features of this item will then be added to their profile to further personalize subsequent recommendation requests.

If there are several played events associated with the same content item, then the combined duration of these events may be used to determine the total percentage played. If the configured threshold percentage is met and a learn action is fired, then there may be no need to generate a further learn action for any subsequent play events for that item during consumption analysis.

In some embodiments learn actions are generated as soon as the configured time threshold/behavior has been detected. This ensure the learning takes place in real time and impacts the user profile as soon as possible for subsequent recommendation requests.

Learn actions may be processed one by one-rather than batching them at potentially peak times. Processing the learn actions immediately is potentially load-reducing as the details of the customer who took the action will likely still be in the cache of the CRE whereas if the action call is delayed the customer may need to be re-loaded from database, thereby increasing the load on back-end systems. The CRE may nonetheless support the capability to take groups of content item ids in a single learn action and to also specify the time that the action took place.

When the system is operated in timeslot mode (to build multiple profiles for a single end user device based on time of day/day of week, for example), a single learn action call with multiple item ids specified may assign the features of those items to the timeslot associated with the specified action time in the learn action. This may occur for example if a user purchases multiple content items at the same time.

Drawings

Figure 1:
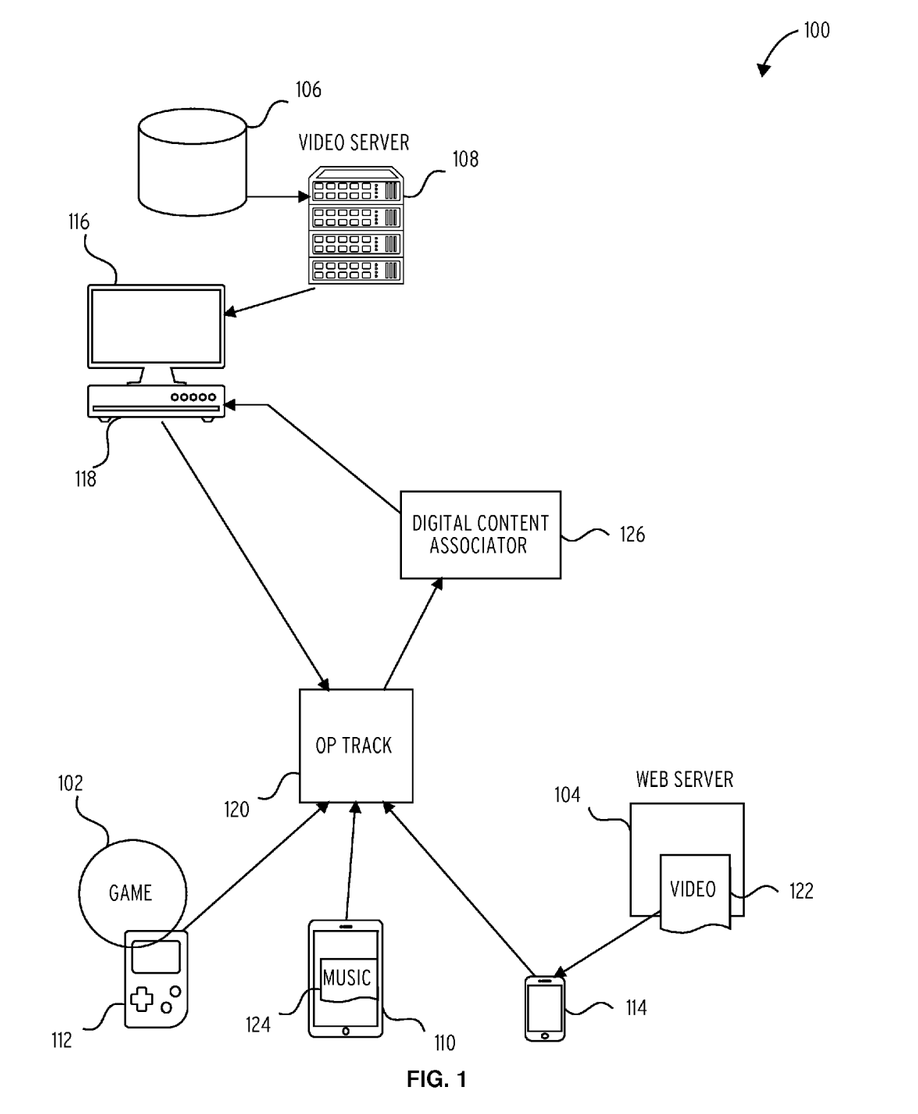
FIG. 1 illustrates an embodiment of an activity classification and content association system 100.

FIG. 1 illustrates an embodiment of an activity classification and content association system 100. The system comprises a video server 108, a machine operation tracking system 120, and a Digital content associator 126.

Devices that may influence the operation of the activity classification and content association system 100 include a set top box 118 coupled with a television 116, a game machine 112 executing game logic 102, a mobile phone 114 that renders a downloaded video 122 from a web server 104, and a tablet 110 that renders a digital music file 124.

The machine operation tracking system 120 detects and identifies content rendered by the various devices and also detects and measures user actions involving said content, for example swipes, clicks, pauses, resumes, fast forwards, rewinds, and ad exposures.

Device operation tracking measurements, content identifications, and associated user actions from the machine operation tracking system 120 are provided to the Digital content associator 126 for processing into user interface controls directed back to one or more of the devices, in this example the set top box 118.

Figure 2:
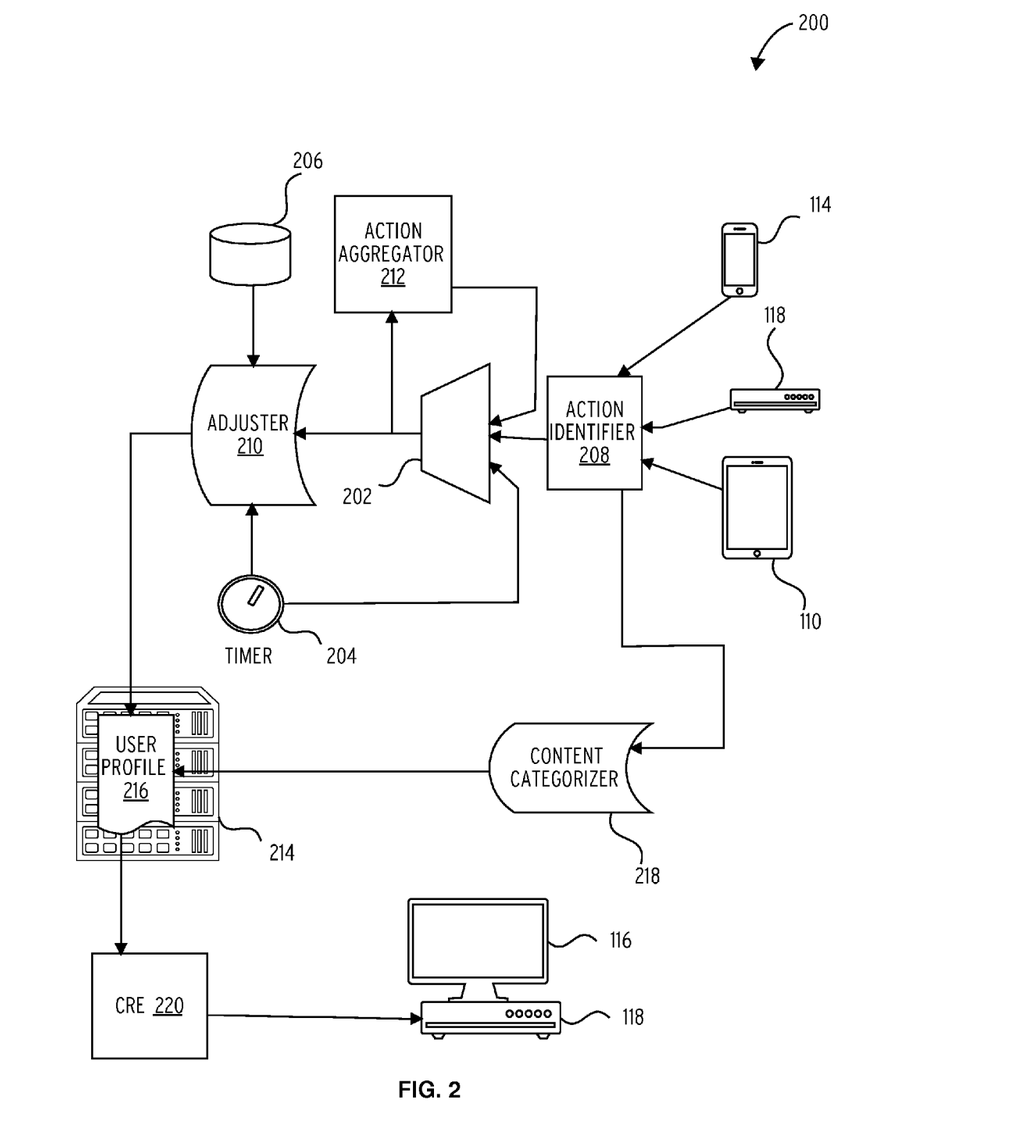
FIG. 2 illustrates an embodiment of a digital content associator 200.

FIG. 2 illustrates an embodiment of a digital content associator 200. The digital content associator 200 comprises an action identifier 208, a re-sequencer 202, an action aggregator 212, a Timer 204, an adjuster 210, an activity weight associator 206, and a profile server 214 hosting a user profile 216.

Various end user digital devices (e.g., a mobile phone 114, set top box 118, and/or a tablet 110) operate on or in association with digital content (which may include digital advertising) and these actions are measured and identified by the action identifier 208. The identified actions are input to the re-sequencer 202 which analyzes timing among and between various identified actions, including actions separated in time but associated with the same digital content. Related actions that are close in time (within a configured time interval, for example) may be sequenced out of the re-sequencer 202 together in order, and/or may be aggregated as a meta-actions (single combined action comprising multiple component actions) by the action aggregator 212.

The action sequence (including possibly meta-actions) is input by the adjuster 210 which is responsive to adjustments from the activity weight associator 206 associated with the identified actions, and/or responsive to a timing or time spacing between actions in the action sequence, as determined by the Timer 204.

The various devices are associated with one or more human users (plural users in the event of a household association, for example) by the profile server 214, which also controls access to and modification of digital files comprising one or more user profile 216. The user profile 216 associated with the user of the various devices measured for operational events and user actions is updated to associate the output of the adjuster 210 and content categories identified by the content categorizer 218 for the digital content that is associated with the device operations and/or user actions.

The content recommender 220 interoperates with the profile server 214 to apply the user profile 216 for form content recommendations for the user, and communicates these recommendations to (for example) the set top box 224 for display on the television 222.

Figure 3:
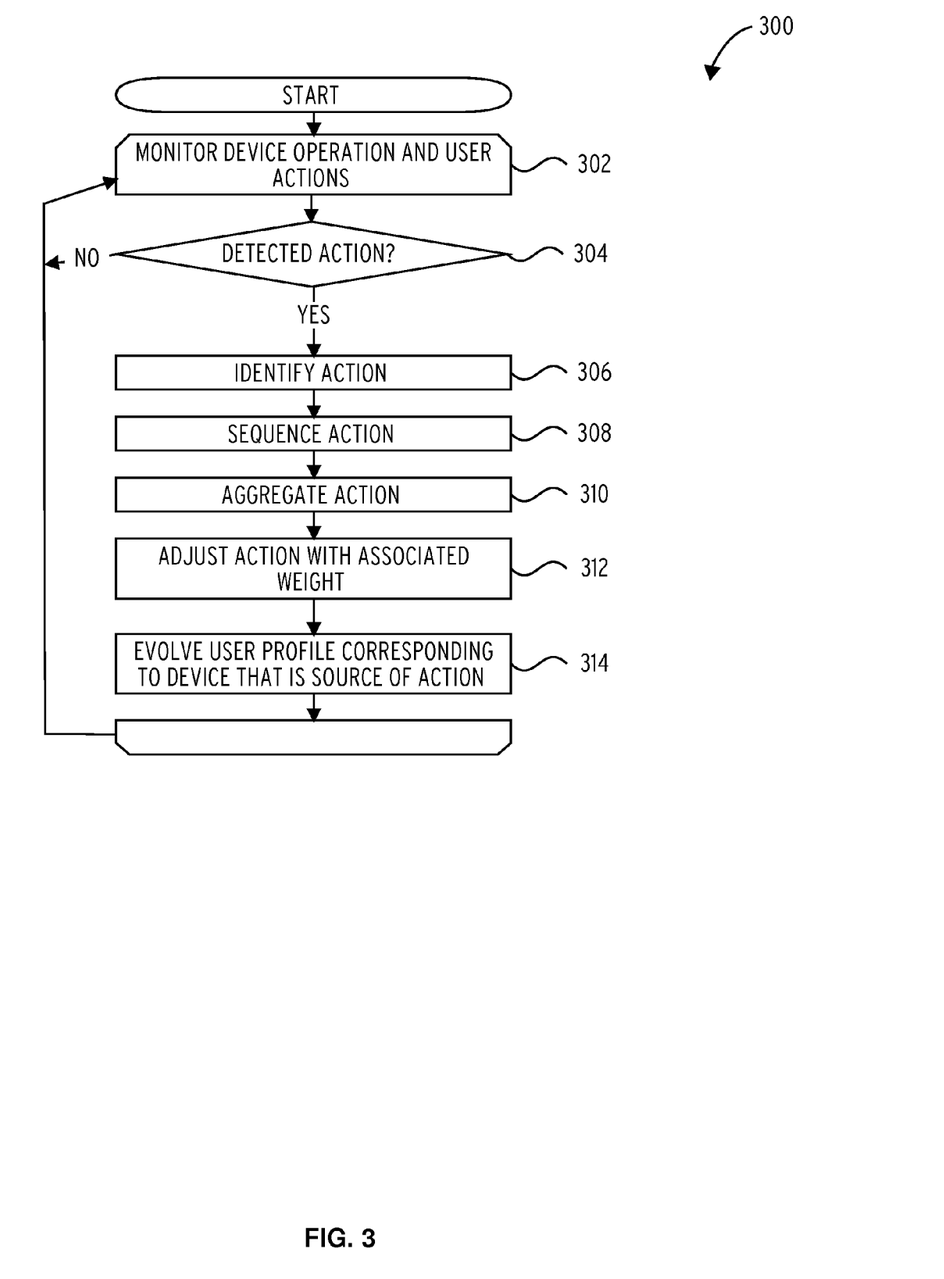
FIG. 3 illustrates an embodiment of a user profile evolution process 300.

FIG. 3 illustrates an embodiment of a user profile evolution process 300.

At opening loop block 302 the process monitors the operation of user devices and user actions on those devices. If an action (which includes user actions and device operations) is detected at decision block 304, the action is identified at block 306. The timing of the action related to other identified actions is analyzed and the action is sequenced (in some embodiments) accordingly at block 308. The action once identified may also be aggregated with other related actions at block 310 (for example, actions all related to the same content item but separated by hours or days in time).

A weight is associated with the identified action (which may be an combined action) at block 312. The user profile is evolved to reflect the affect of the identified weighted action on user content preferences at block 314

Figure 4:
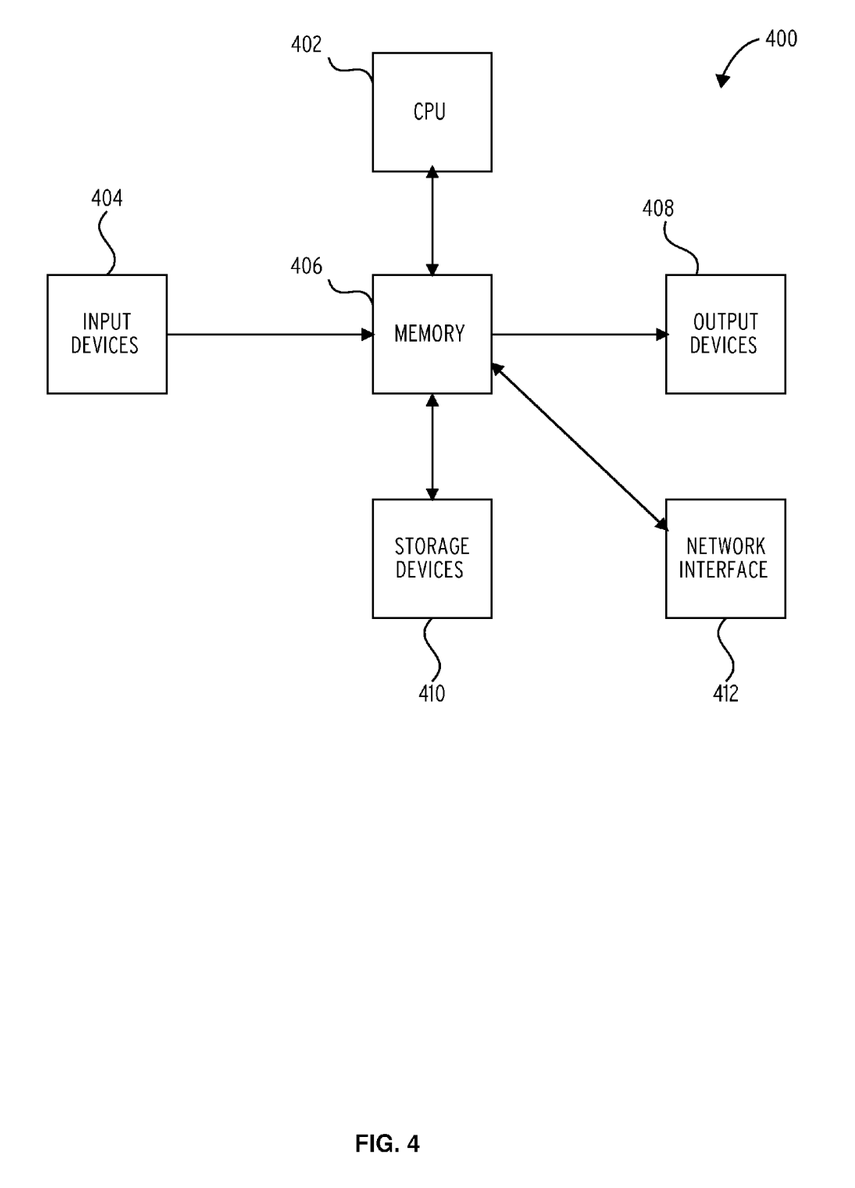
FIG. 4 illustrates an embodiment of a digital apparatus 400 to implement components and process steps of the system described herein.

FIG. 4 illustrates an embodiment of a digital apparatus 400 to implement components and process steps of the system described herein.

Input devices 404 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 404 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 404 are provided via various machine signal conductors (e.g., busses or network interfaces) and circuits to memory 406.

The memory 406 is typically what is known as a first or second level memory device, providing for storage (via configuration of matter or states of matter) of signals received from the input devices 404, instructions and information for controlling operation of the CPU 402, and signals from storage devices 410.

Information stored in the memory 406 is typically directly accessible to the CPU 402 of the device. Signals input to the device cause the reconfiguration of the internal material/ energy state of the memory 406, creating in essence a new machine configuration, influencing the behavior of the digital apparatus 400 by affecting the behavior of the CPU 402 with control signals (instructions) and data provided in conjunction with the control signals.

Second or third level storage devices 410 may provide a slower but higher capacity machine memory capability. Examples of storage devices 410 are hard disks, optical disks, large capacity flash memories or other non-volatile memory technologies, and magnetic memories.

The CPU 402 may cause the configuration of the memory 406 to be altered by signals in storage devices 410. In other words, the CPU 402 may cause data and instructions to be read from storage devices 410 in the memory 406 from which may then influence the operations of CPU 402 as instructions and data signals, and from which it may also be provided to the output devices 408. The CPU 402 may alter the content of the memory 406 by signaling to a machine interface of memory 406 to alter the internal configuration, and then converted signals to the storage devices 410 to alter its material internal configuration. In other words, data and instructions may be backed up from memory 406, which is often volatile, to storage devices 410, which are often non-volatile.

Output devices 408 are transducers which convert signals received from the memory 406 into physical phenomenon such as vibrations in the air, or patterns of light on a machine display, or vibrations (i.e., haptic devices) or patterns of ink or other materials (i.e., printers and 3-D printers).

The network interface 412 receives signals from the memory 406 and converts them into electrical, optical, or wireless signals to other machines, typically via a machine network. The network interface 412 also receives signals from the machine network and converts them into electrical, optical, or wireless signals to the memory 406.

Figure 5:
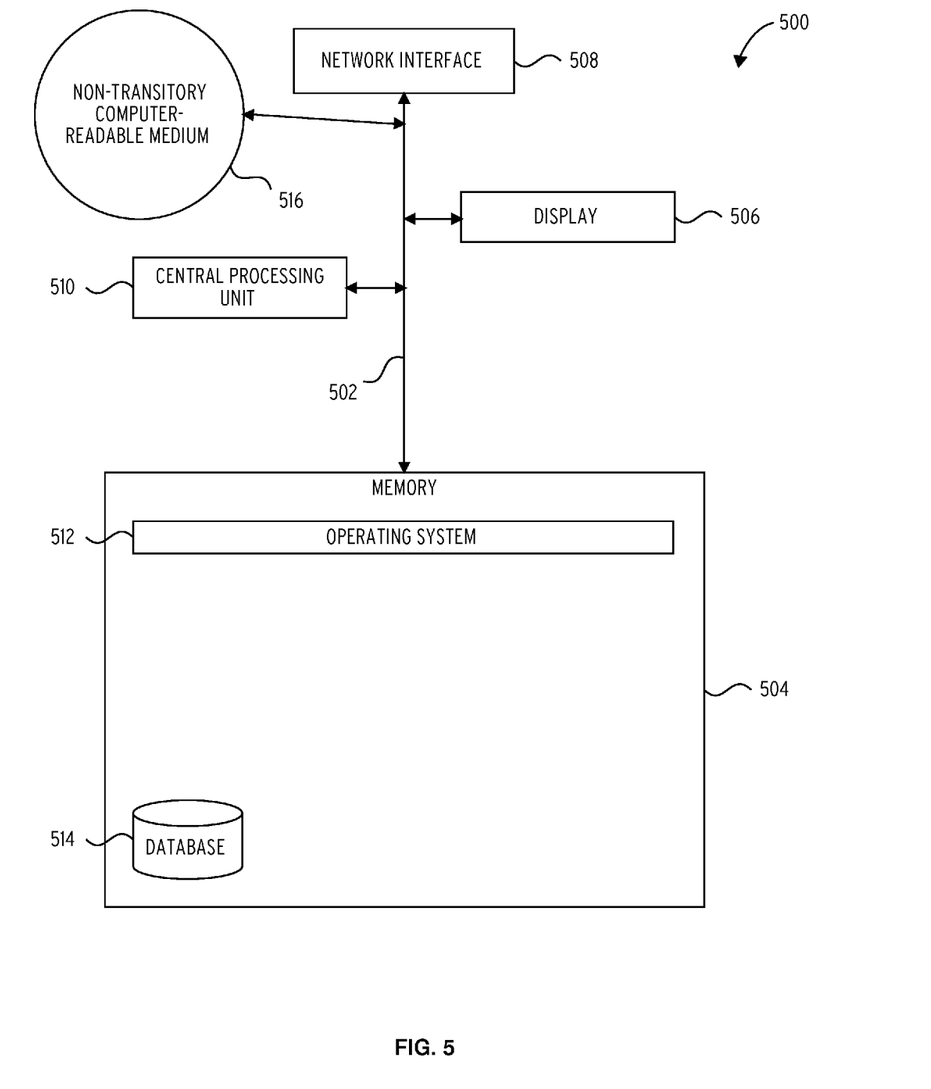
FIG. 5 illustrates a server 500 in accordance with one embodiment.

FIG. 5 illustrates several components of an exemplary server 500 in accordance with one embodiment. In various embodiments, server 500 may include a desktop PC, server, workstation, mobile phone, laptop, tablet, set-top box, appliance, or other computing device that is capable of performing operations such as those described herein. In some embodiments, server 500 may include many more components than those shown in FIG. 5. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, server 500 may comprise one or more physical and/or logical devices that collectively provide the functionalities described herein. In some embodiments, server 500 may comprise one or more replicated and/or distributed physical or logical devices.

In some embodiments, server 500 may comprise one or more computing resources provisioned from a "cloud computing" provider, for example, Amazon Elastic Compute Cloud ("Amazon EC2"), provided by Amazon.com, Inc. of Seattle, Washington; Sun Cloud Compute Utility, provided by Sun Microsystems, Inc. of Santa Clara, Calif.; Windows Azure, provided by Microsoft Corporation of Redmond, Wash., and the like.

Server 500 includes a bus 502 interconnecting several components including a network interface 508, a display 506, a central processing unit 510, and a memory 504.

Memory 504 generally comprises a random access memory ("RAM") and permanent non-transitory mass storage device, such as a hard disk drive or solid-state drive. Memory 504 stores an operating system 512.

These and other software components may be loaded into memory 504 of server 500 using a drive mechanism (not shown) associated with a non-transitory computer-readable medium 516, such as a floppy disc, tape, DVD/CD-ROM drive, memory card, or the like.

Memory 504 also includes database 514. In some embodiments, server 200 (deleted) may communicate with database 514 via network interface 508, a storage area network ("SAN"), a high-speed serial bus, and/or via the other suitable communication technology.

In some embodiments, database 514 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of " circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A machine system for controlling a video server, the system comprising:
   a monitor to detect and identify discrete user actions on a single digital content rendered on a network connected digital devices;
   a first associator to relate the discrete user actions to digital content;
   a sequencer operable in conjunction with a timer to aggregate the discrete user actions into an aggregate user meta-action, the aggregate user meta-action forming a new discrete combined action;
   a second associator operable in conjunction with the timer and an adjuster to associate weight values with the aggregate user meta-action and with additional discrete user actions on the single digital content, forming weighted user actions for the single digital content;
   wherein the second associator lowers a weight assigned to a purchase event based on an assumed payment that is actually made at a later time in conjunction with a follow-up played consumption event;
   the aggregate user meta-action formed based on configured intervals between the discrete user actions as measured by the timer;
   a profile server responsive to the second associator to evolve a user profile according to the weighted user actions; and
   a video server to communicate additional digital content to the connected digital devices, the additional digital content selected according to the user profile.

2. The machine system of claim 1, further comprising:
   the monitor to further detect and identify operations of the digital devices; and
   the first associator to relate the operations of the digital devices to the user actions.

3. The machine system of claim 1, further comprising:
   a content recommender to recommend the additional digital content to the digital devices responsive to the user profile.

4. The machine system of claim 1, further comprising:
   at least one of the aggregate user meta-actions formed from an accumulation of playback of the single digital content item over a plurality of separated time intervals.

5. A method for controlling a video server, comprising:
   detecting and identifying discrete user actions on a single digital content rendered on network connected digital devices;
   relating the discrete user actions to the single digital content;
   operating a sequencer and a timer to form aggregate user meta-actions on the single digital content, from the discrete user actions;
   operating a second associator in conjunction with the timer and an adjuster to associate weight values with the aggregate user meta-actions and additional discrete user actions on the single digital content, forming weighted user actions;
   the second associator lowering a weight assigned to a purchase event based on an assumed payment that is actually made at a later time in conjunction with a follow-up played consumption event;
   forming the aggregate user meta-actions based on configured intervals between the discrete user actions on the single digital content, as measured by the timer;
   operating a profile server responsive to the second associator to evolve a user profile according to the weighted user actions; and
   applying the user profile to control the output of a video server.

6. The method of claim 5, further comprising:
   detecting and identifying operations of the digital devices; and
   relating the operations of the digital devices to the discrete user actions.

7. The method of claim 5, further comprising:
   recommending additional digital content to the digital devices responsive to the user profile.

8. The method of claim 5, further comprising:
   forming at least one of the aggregate user meta-actions as an accumulation of playback of the single digital content item over a plurality of separated time intervals.

9. A non-transitory computer-readable storage medium for controlling a video server, the computer-readable storage medium including instructions that when executed by a computer, cause the computer to:
   detect and identify discrete user actions on a single digital content rendered on network connected digital devices;
   relate the discrete user actions to the single digital content;
   operate a sequencer and a timer to form aggregate user meta-actions on the single digital content from the discrete user actions;
   operate a second associator in conjunction with the timer and an adjuster to associate weight values with the aggregate user meta-actions and the user actions, forming weighted user actions;

operate the second associator to lower a weight assigned to a purchase event based on an assumed payment that is actually made at a later time in conjunction with a follow-up played consumption event;

form the aggregate user meta-actions based on configured intervals between the discrete user actions as measured by the timer;

operate a profile server responsive to the second associator to evolve a user profile according to the weighted user actions; and operate a video server to output additional digital content selected based on the user profile.

10. The computer-readable storage medium of claim 9, wherein the instructions further configure the computer to:

detect and identify operations of the digital devices; and relate the operations of the digital devices to the discrete user actions.

11. The computer-readable storage medium of claim 9, wherein the instructions further configure the computer to:

recommend the additional digital content to the digital devices responsive to the user profile.

12. The computer-readable storage medium of claim 9, wherein the instructions further configure the computer to:

form at least one of the aggregate user meta-actions as an accumulation of playback of the single digital content item over a plurality of separated time intervals.

\* \* \* \* \*